Patented Apr. 6, 1943

2,315,529

UNITED STATES PATENT OFFICE 2,315,529

PHOSPHORUS SULPHIDE-HYDROCARBON REACTION PRODUCT

Charles D. Kelso, Calumet City, Ill., assignor to Standard Oil Company, Chicago, Ill., a corporation of Indiana No Drawing. Application March 24, 1941
Serial No. 384,944

12 Claims. (Cl. 260—139)

This invention relates to improvements in the preparation of sulphur and phosphorus-containing or phosphorus-containing olefin polymers and in particular relates to improvements in the preparation of phosphorus sulphide-olefin polymer reaction products.

In a copending application of C. M. Loane and J. W. Gaynor, Serial No. 384,936, filed March 24, 1941, there is described a method of preparing phosphorus sulphide-olefin polymer reaction products and the uses of such products in lubricating oils; and in a copending application of C. M. Loane and J. W. Gaynor, Serial No. 384,940, filed March 24, 1941, there is described the preparation of phosphorus sulphide-hydrocarbon reaction products and the uses of such products in lubricating oils, as sludge, and/or varnish inhibitors.

I have discovered an improved method of preparing these reaction products which produces reaction products having higher phosphorus and sulphur content. This improvement comprises carrying out the reaction in a non-oxidizing atmosphere such as in an atmosphere of, for example, hydrocarbon gases, carbon dioxide, nitrogen or other non-oxidizing gas, and preferably nitrogen.

In the aforesaid copending Loane and Gaynor applications there is described the preparation of the products obtained by reacting a phosphorus sulphide such as $P_2S_3$, $P_2S_5$, $P_4S_7$, $P_4S_3$, and preferably $P_2S_5$, with a polymer of an olefinic hydrocarbon, particularly with a polymer of a low molecular weight mono-olefinic hydrocarbon, or with other hydrocarbons.

The mono-olefin polymer to be treated may be the polymer resulting from the polymerization of a low molecular weight iso-mono-olefin such as isobutylene and isoamylene and/or the copolymers obtained by the polymerization of hydrocarbon mixtures containing low molecular weight iso-mono-olefins and normal mono-olefins such as those of less than six carbon atoms, and preferably those of four carbon atoms. The polymer may be obtained by the polymerization of these mono-olefins or mixed mono-olefins in the presence of a catalyst such as sulphuric acid, phosphoric acid, boron fluoride, aluminum chloride or other similar halide catalyst of the Friedel-Crafts type.

The polymers employed are preferably mono-olefin polymers, in which the molecular weight ranges from about 150 to about 50,000 or more, and preferably from about 500 to about 10,000. These polymers can be obtained, for example, by the polymerization in the liquid phase of iso-olefins such as isobutylene or hydrocarbon mixtures containing the same at a temperature of from about —80° F. to about 100° F., in the presence of a catalyst such as boron fluoride. In the preparation of these polymers, I employ, for example, liquid isobutylene or a hydrocarbon mixture containing isobutylene, butane, and butylene, recovered from petroleum gases especially those gases produced in the cracking of petroleum oils in the manufacture of gasoline. This light fraction may contain from about 10% to about 25% isobutylene, the remainder being principally butanes and normal butylene.

The preparation of low molecular weight polymers having molecular weights varying from about 100 to about 2,000, from the butane-butylene-isobutylene fraction can be carried out as follows: The hydrocarbon mixture containing 10% to 25% isobutylene is maintained under pressure sufficient to keep it in the liquid phase and cooled to a temperature of, for example, from about 0° F. to about 100° F., and preferably from about 0° F. to about 32° F. and from about 0.1% to about 2% boron fluoride, based upon the isobutylene content of the material treated, is added with vigorous agitation. Excessive rise in the temperature due to the heat of reaction can be avoided by efficient cooling. After the polymerization of the isobutylene together with a relatively minor amount of the normal olefins present, the reaction mass is neutralized and washed free of acidic substances arising from the catalyst, the oily layer is separated, and the polymer subsequently separated from the unreacted hydrocarbons by distillation. The polymer mixture so obtained, depending upon the temperature of reaction, varies in consistency from a light liquid to a viscous oily material and contains polymers having molecular weights ranging from about 100 to about 2,000. The polymers so obtained can be treated with $P_2S_5$ or other phosphorus sulphide or the polymer can be fractionated under reduced pressure into fractions of increasing molecular weight, for example, a tetramer fraction having a boiling point range between 470° F. and 475° F. and, for example, a distillate of about 150 seconds to about 200 seconds Saybolt Universal viscosity at 100° F., or other desired fractions, and the fractions, or any one of them, can be reacted with a phosphorus sulphide. The bottoms resulting from the distillation of the polymer are well suited for the purpose of the present invention. Bottoms having Saybolt Universal viscosities at 210° F. of from about 50 seconds to about 10,000 seconds, and peferably above about 80 seconds, can be employed.

Another source of an olefinic polymer suitable for use in accordance with my invention is a fraction of the polymer obtained in the treatment of a gaseous hydrocarbon mixture containing isobutylene and normal butylene in the presence of phosphoric acid catalysts in the synthesis of isooctane. The polymer can be obtained by subjecting a gas mixture comprising less than $C_6$ hydrocarbons, and preferably $C_4$ olefins and paraffins, to temperatures of about 270° F. to 430° F., preferably about 300° F. to about 330° F., and at a pressure of from about 500 pounds per square inch to about 750 pounds per square inch, preferably about 600 pounds per square inch, in the presence of a catalyst such as phosphoric acid on kieselguhr, diatomaceous earth of aluminum-free clay. The mixed polymer obtained consists essentially of dimer, but contains in addition about 5-10% and usually 6-7% of heavy polymer comprising trimer, tetramer and still higher polymers. This heavy polymer fraction can be separated and treated with the sulphur compound of phosphorus as such or it may be still further fractionated to give about 10-15% bottoms, which comprise essentially a tetramer fraction and boil between about 400° F. and 520° F.

Hydrocarbon reactants other than the polymers above described which can be employed are hydrocarbons such as paraffins, aromatics, alkyl aromatics, cyclic aliphatics, petroleum fractions, such as lubricating oil fractions, petrolatums, waxes, cracked cycle stocks, condensation products of petroleum fractions, solvent extracts of the petroleum fractions, etc.

The paraffin hydrocarbons may be those obtained from petroleum oils such as bright stock residuums, lubricating oil distillates, petrolatums, paraffin waxes and the like. The foregoing paraffins may be halogenated and condensed with aromatic hydrocarbons in the presence of anhydrous inorganic halides such as aluminum chloride, zinc chloride and the like.

I may also employ as the starting material a synthetic lubricating oil obtained by polymerizing, in the presence of aluminum chloride, unsaturated hydrocarbons resulting from the vapor phase cracking of paraffin waxes as described in United States Patents Nos. 1,995,260 and 1,970,002, and others.

Another class of compounds which may be used as the hydrocarbon reactants are the aromatic hydrocarbons such as, for example, benzene, naphthalene, toluene, xylene, diphenyl or the like, or alkylated aromatic hydrocarbons such as, for example, alkyl substituted benzene, alkyl substituted naphthalene and the like.

In accordance with the present invention the phosphorus sulphide-mono-olefin polymer reaction product is prepared by reacting a phosphorus sulphide, preferably phosphorus pentasulphide, with a polymer or hydrocarbon of the type hereindescribed at a temperature of from about 200° F. to about 500° F. and preferably from about 300° F. to about 400° F. while maintaining a non-oxidizing atmosphere above the reaction mixture. A non-oxidizing atmosphere can be maintained above the reaction mixture by carrying out the reaction in a closed vessel and introducing a non-oxidizing medium, such as nitrogen, thereinto while the reaction is taking place. The polymer or hydrocarbon may be reacted with from about 1% to about 50% and preferably from about 5% to about 25% of its weight of phosphorus sulphide. It is preferable to use an amount that will completely react with the hydrocarbon so that no further purification becomes necessary. However, excess phosphorus sulphide may be used and subsequently separated from the product by filtering or by diluting the reaction product with a solvent such as hexane, filtering and distilling or evaporating off the solvent. Usually the phosphorus sulphide-hydrocarbon or olefin polymer reaction products have a characteristic odor, which for certain uses may not be desirable. This undesirable odor can be removed substantially by steam blowing the reaction product at an elevated temperature of from about 200° F. to about 600° F. until the product is substantially odorless.

The following examples illustrate the increased phosphorus and sulphur content obtained when the phosphorus sulphide-hydrocarbon reaction product is prepared in a non-oxidizing atmosphere, such as an atmosphere of nitrogen.

*Example I*

An isobutylene polymer having a Saybolt Universal viscosity of about 3000 seconds at 210° F. obtained by polymerizing a mixture of $C_4$ olefins and paraffins in the presence of boron fluoride was mixed with 10% of phosphorus pentasulphide and the mixture heated for six hours at a temperature of 380° F. in the presence of air with vigorous stirring. The product had a phosphorus content of 1.3% and a sulphur content of 3.4%.

*Example II*

An isobutylene polymer having a Saybolt Universal viscosity at 210° F. of about 3000 seconds obtained by polymerizing a mixture of $C_4$ paraffins and olefins in the presence of boron fluoride was mixed with 10% of the phosphorus pentasulphide and the mixture heated in a nitrogen atmosphere in a closed vessel, at a temperature of 380° F. for six hours with vigorous stirring. The product had a phosphorus content of 2.97% and a sulphur content of 5.62%.

The above examples are illustrative of the increased phosphorus and sulphur content of phosphorus sulphide-hydrocarbon reaction products prepared in a non-oxidizing atmosphere such as an atmosphere of nitrogen.

While I have illustrated my invention by preferred examples thereof, I do not wish to be limited thereby, since other modifications and variations may be made without departing from the scope and spirit of my invention.

I claim:

1. In the preparation of a phosphorus sulphide-hydrocarbon reaction product by reacting a phosphorus sulphide with a hydrocarbon at an elevated temperature, the improvement comprising conducting the reaction in a non-oxidizing atmosphere whereby a phosphorus sulphide-hydrocarbon reaction product having an increased phosphorus and sulphur content is obtained.

2. In the preparation of a phosphorus sulphide-hydrocarbon reaction product by reacting a phosphorus sulphide with a hydrocarbon at an elevated temperature, the improvement comprising conducting the reaction in an atmosphere of nitrogen whereby a phosphorus sulphide-hydrocarbon reaction product having an increased phosphorus and sulphur content is obtained.

3. The method of increasing the phosphorus and sulphur content of a phosphorus sulphide-hydrocarbon reaction product comprising mixing a hydrocarbon with a phosphorus sulphide and heating the mixture at a temperature of from about 200° F. to about 450° F. in a non-oxidizing atmosphere.

4. In the preparation of a phosphorus sulphide-olefin polymer reaction product by reacting a phosphorus sulphide with an olefin polymer, the improvement comprising carrying out the reaction in a non-oxidizing atmosphere at a temperature of at least about 200° F. whereby a phosphorus sulphide-olefin polymer reaction product having an increased phosphorus and sulphur content is obtained.

5. The preparation of a phosphorus sulphide-olefin polymer reaction product as described in claim 4 in which the inert atmosphere is an atmosphere of nitrogen.

6. The method of increasing the phosphorus and sulphur content of a phosphorus sulphide-isobutylene polymer reaction product comprising heating a phosphorus sulphide and an isobutylene polymer at a temperature of from about 200° F. to about 500° F. in a non-oxidizing atmosphere.

7. The method as described in claim 6 in which the phosphorus sulphide is phosphorus pentasulphide and the isobutylene is a high molecular weight isobutylene polymer obtained by polymerizing a mixture of $C_4$ olefin hydrocarbons and paraffin hydrocarbons in the presence of boron fluoride.

8. The method of increasing the phosphorus and sulphur content of a phosphorus sulphide-mono-olefin polymer reaction product comprising reacting a mixture of a phosphorus sulphide and a mono-olefin polymer at a temperature of from about 200° F. to about 500° F. in a non-oxidizing atmosphere.

9. The method as described in claim 8 in which the mono-olefin polymer is a polymer having a molecular weight of from about 100 to about 50,000.

10. The method of increasing the phosphorus and sulphur content of a phosphorus pentasulphide-isobutylene polymer reaction product comprising reacting an isobutylene polymer with from about 5% to about 50% of a phosphorus sulphide at a temperature of from about 200° F. to about 500° F. in an atmosphere of nitrogen.

11. The method of increasing the phosphorus and sulphur content of a phosphorus pentasulphide-isobutylene polymer reaction product comprising heating an isobutylene polymer with from about 5% to about 50% phosphorus pentasulphide at a temperature of from about 200° F. to about 500° F. in an atmosphere of nitrogen.

12. The method as described in claim 11 in which the isobutylene polymer is a polymer having a Saybolt Universal viscosity at 210° F. of about 900 seconds to about 3500 seconds.

CHARLES D. KELSO.